United States Patent
Hartman (10) Patent No.: US 10,637,786 B2
(45) Date of Patent: Apr. 28, 2020

(54) NETWORK TRAFFIC AND PROCESSOR ACTIVITY MANAGEMENT APPARATUSES, SYSTEMS, AND METHODS

(71) Applicant: California Eastern Laboratories, Inc., Santa Clara, CA (US)

(72) Inventor: James Paul Hartman, Canton, GA (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 0 days.

(21) Appl. No.: 15/835,431

(22) Filed: Dec. 7, 2017

(65) Prior Publication Data

US 2019/0182172 A1 Jun. 13, 2019

(51) Int. Cl.
*H04L 12/841* (2013.01)
*G06F 9/30* (2018.01)
*H04W 84/18* (2009.01)

(52) U.S. Cl.
CPC .......... *H04L 47/28* (2013.01); *G06F 9/30076* (2013.01); *H04W 84/18* (2013.01)

(58) Field of Classification Search
CPC ........ H04L 47/10; H04L 47/28; H04J 3/0685; G06F 15/16
See application file for complete search history.

(56) References Cited

U.S. PATENT DOCUMENTS

| | | | | |
|---|---|---|---|---|
| 4,922,438 A | * | 5/1990 | Ballweg | H04J 3/0632 370/465 |
| 5,337,313 A | * | 8/1994 | Buchholz | H04Q 11/0478 370/394 |
| 6,538,995 B1 | * | 3/2003 | Cox | H04Q 11/0478 370/232 |
| 6,629,217 B1 | * | 9/2003 | Clohset | G06F 13/161 711/154 |
| 7,356,032 B1 | * | 4/2008 | Sumorok | H04L 29/12028 370/392 |
| 9,100,330 B1 | * | 8/2015 | Noveck | H04L 47/283 |
| 2003/0133465 A1 | * | 7/2003 | Alfano | H04J 3/0685 370/412 |
| 2004/0177108 A1 | * | 9/2004 | Connelly | G06F 9/542 709/201 |

(Continued)

*Primary Examiner* — Melanie Jagannathan
(74) *Attorney, Agent, or Firm* — Richard W. James (57) ABSTRACT

A system, apparatus, and method for network traffic and processor activity management. The invention includes a network communication device for communicating data to remote devices, a data storage device for storing a plurality of messages to be communicated on the network by the network communication device, a real-time clock, and a processor. The processor includes instructions which, when executed by the processor, cause the processor to receive a signal from the real-time clock that at least one message in the data storage device is to be communicated on the network through the network communication device, retrieve the at least one message from the data storage device, transmit the at least one retrieved message and up to a predetermined number of retrieved messages onto the network through the network communication device, and prevent any messages retrieved from the data storage device that are more than the predetermined number from being transmitted on the network for a predetermined period of time.

15 Claims, 8 Drawing Sheets

(56) References Cited

U.S. PATENT DOCUMENTS

| | | | | |
|---|---|---|---|---|
| 2004/0190537 A1* | 9/2004 | Ferguson | ............... | H04L 47/10 |
| | | | | 370/412 |
| 2007/0047575 A1* | 3/2007 | Cui | .................... | H04L 12/4633 |
| | | | | 370/465 |
| 2009/0280815 A1* | 11/2009 | Roberts | ................ | H04W 36/02 |
| | | | | 455/436 |
| 2012/0290800 A1* | 11/2012 | Krishnan | ............ | G06F 13/1689 |
| | | | | 711/159 |
| 2014/0071823 A1* | 3/2014 | Pannell | .................. | H04L 47/22 |
| | | | | 370/230.1 |
| 2014/0122790 A1* | 5/2014 | Lasserre | ........... | G11C 11/40611 |
| | | | | 711/106 |
| 2014/0140209 A1* | 5/2014 | Shihada | ............. | H04L 43/0864 |
| | | | | 370/230 |
| 2017/0346762 A1* | 11/2017 | Lapidous | .................. | H04L 1/16 |
| 2018/0262284 A1* | 9/2018 | Pei | .......................... | H04W 4/60 |

* cited by examiner

NETWORK TRAFFIC AND PROCESSOR ACTIVITY MANAGEMENT APPARATUSES, SYSTEMS, AND METHODS

CROSS-REFERENCE TO RELATED APPLICATIONS

None.

FIELD OF THE INVENTION

The present invention is concerned with managing peak network traffic and processor activity. In particular, embodiments of the invention limit the amount of traffic transmitted on a network at a time or in a predetermined time period and limit processor activity on a particular task.

BACKGROUND OF THE INVENTION

Computer automated control systems often send control messages across a network to actuate controlled apparatuses in those networks. Moreover, frequently a large number of scheduled event messages are retrieved from a data storage device and transmitted across such a network in a short period of time. For example, if lights are to be energized or de-energized at a scheduled time, scheduled event messages may be read for each lighting fixture or bank of fixtures that are controlled together. In addition, an operational control message may be sent across the network to each lighting fixture or bank of fixtures that are controlled together to actuate the lights scheduled to be energized or de-energized. In a large building where many areas, such as lobbies and common areas, are to be lit at one particular time, many scheduled event messages may be read and many control messages may be sent across the network at a time or during a short period of time.

When a large, mesh-networked system is managed and controlled by, for example, a resource-limited, single flow embedded processing system, inefficiencies can arise that impact overall system performance and user experience. One inefficiency that can occur in such a system is when the processor is required to traverse a large table or list of scheduled system events located in an external data storage device to determine whether the scheduled events are to be performed or have become active. When the processor accesses the data storage device to read events, the processor may be occupied performing this task for a relatively long time during which time the processor cannot perform other actions. Such processor delays may create delays in other activities to be performed by the processor, including responding to user requests, such as user switch operation, such that actuation of the desired end device by the system is delayed or not acted upon by the system. Processor delays may also cause delay in other system operations.

Another inefficiency in such a system occurs when a large number of messages are being sent over the network. When too many messages are sent across the network, the network may become congested and operate inefficiently, message delivery may be delayed, network queues may overflow, thereby losing messages, messages may otherwise be lost and fail to be delivered by the network as required, and users may experience delays or failures in system operation.

Thus, there is a need for systems, apparatuses, and methods to prevent a processor from spending too much time traversing a data structure in a data storage device.

There is also a need for systems, apparatuses, and methods that provide a delay for a processor that has recently searched a data storage device for scheduled events before that processor searches for additional scheduled events in that data storage device.

There is also a need for systems, apparatuses, and methods to prevent a number of messages that may overwhelm a network from being sent across the network at a time or in a short period of time.

There is also a need for systems, apparatuses, and methods that provide a delay in sending messages across a network when many messages have recently been sent across that network.

Embodiments of network traffic management apparatuses, systems and methods prevent a processor from being overly occupied with searching a data storage device for scheduled events.

Embodiments of network traffic management apparatuses, systems, and methods delay the processors next access of a data storage device after that processor has been occupied accessing that data storage device.

Embodiments of network traffic management apparatuses, systems and methods prevent a network from being overwhelmed by limiting the number of messages to be sent across a network at or near the same time.

Embodiments of network traffic management apparatuses, systems, and methods delay sending messages across a network after many messages have been sent across that network.

Embodiments of network traffic management apparatuses, systems and methods distribute the transmission of messages to be sent at a particular time to prevent loss of transmitted messages or other problems that can occur when many messages are sent at or near the same time.

SUMMARY OF THE INVENTION

Embodiments of network traffic and processor activity management apparatuses, systems, and methods are directed to systems, apparatuses, and methods for managing network traffic and limiting processor activity on one of its tasks.

Embodiments of the present network traffic and processor activity management apparatuses, systems, and methods may use a variety of strategies to limit use of certain elements of the system to prevent them from being overwhelmed or inundated by one or more type of operation or task.

In accordance with one embodiment of network traffic and processor activity management apparatuses, systems, and methods, an apparatus includes a network communication device for communicating data to remote devices, a data storage device for storing a plurality of messages to be communicated on the network by the network communication device, a real-time clock, and a processor. The processor includes instructions which, when executed by the processor, cause the processor to receive a time signal from the real-time clock, retrieve at least one event and up to a predetermined number of events from the data storage device, transmit at least one message associated with the at least one retrieved event that is to be transmitted over a network through the network communication device at or near the time signaled by the real-time clock, and up to a predetermined number of retrieved messages over the network through the network communication device.

In accordance with another embodiment of network traffic and processor activity management apparatuses, systems, and methods, a network traffic management method includes receiving a time signal indicating the current time from a real-time clock, retrieving up to a predetermined number of events from a data storage device, determining which retrieved events are to be transmitted over a network after the current time, and transmitting messages associated with each retrieved event that is to be transmitted over a network through the network communication device after the current time over the network through the network communication device.

In accordance with another embodiment of network traffic and processor activity management apparatuses, systems, and methods, a processor activity system includes a data storage device for storing a plurality of events to be communicated on the network by the network communication device, a real-time clock, and a processor coupled to the network communication device, the data storage device, and the real-time clock. The processor includes instructions which, when executed by the processor, cause the processor to read up to a predetermined number of events from the data storage device in an iteration, stop reading scheduled events from the storage device when a predetermined number of events have been read from the data storage device, perform other functions for a predetermined amount of time, and read up to the predetermined number of different events from the data storage device after the predetermined amount of time has passed in a second iteration.

Accordingly, the present invention provides solutions to the shortcomings of prior network traffic and processor activity management apparatuses, systems, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of network traffic and processor activity management apparatuses, systems, and methods.

DETAILED DESCRIPTION OF THE INVENTION

Reference will now be made to embodiments of network traffic management apparatuses, systems, and methods, examples of which are illustrated in the accompanying drawings. Details, features, and advantages of those network traffic management apparatuses, systems, and methods will become further apparent in the following detailed description of embodiments thereof. It is to be understood that the figures and descriptions included herein illustrate and describe elements that are of particular relevance to network traffic management apparatuses, systems, and methods, while eliminating, for purposes of clarity, other elements found in typical computerized access systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
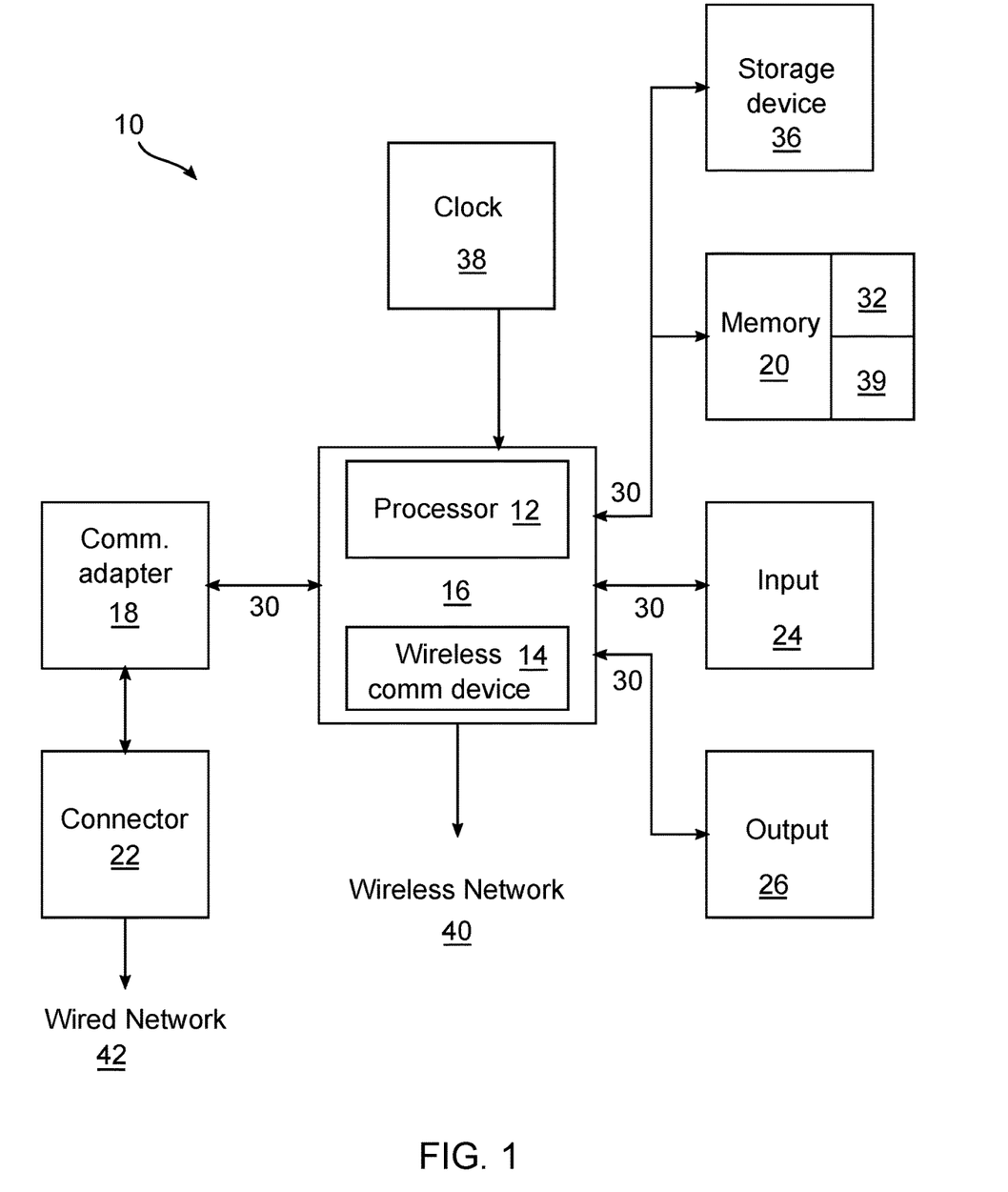
FIG. 1 illustrates an embodiment of a gateway that performs network traffic and processor activity management in one embodiment of the invention.

FIG. 1 illustrates an embodiment of a gateway 10 that performs network traffic management in one embodiment. The gateway 10 includes a processor 12 and a wireless network communication device 14, which may be a ZigBee® network communication device. The processor 12 and wireless communication device 14 may be combined in a controller 16, which may be a microcontroller. The gateway 10 also may include a communication adaptor 18, memory 20, a communication adaptor port or connector 22, one or more input devices 24, diagnostic output devices 26, and a clock 38.

The gateway 10 may furthermore facilitate communications across networks including a wireless network 40 and a wired network 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adapter 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 26. Data from the data storage device 36 that is to be sent across the network 40 or 42 through the processor 12 may be sent in the form of messages in packets. Those messages may furthermore be queued in or by the processor 12.

The communication adaptor 18 perm its communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate. Moreover, the data storage device 36 may also not be necessary for operation of the gateway 10 as data may be stored in memory, for example. Data may also be stored remotely and accessed over a network, such as the Internet.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

Figure 2:
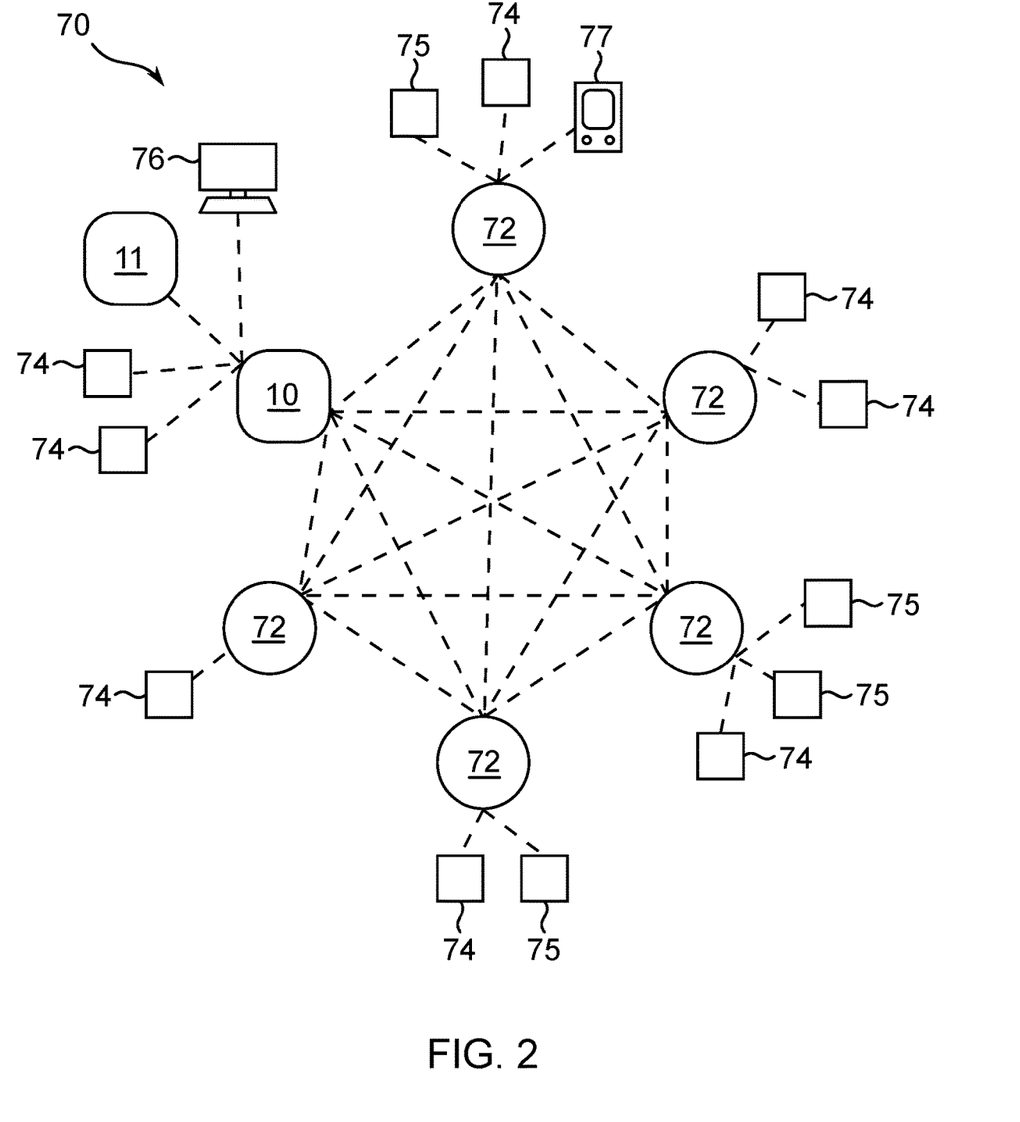
FIG. 2 illustrates an embodiment of a network in an embodiment of network traffic management.

FIG. 2 illustrates a network 70 in an embodiment of network traffic management. The network 70 includes a gateway 10, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter a queue and may be placed in that queue by the processor 12. Those messages to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72 or 74 or events to be actuated at one or more of the end device receiving nodes 72, 74, or 75 such as turning a light on or off or energizing a motor on a motorized window shade or blind.

In an embodiment of queue operation, only as many as a predetermined number of messages are permitted to be transmitted across the network in a predetermined message transmission time period. The predetermined message transmission time period may, for example, be a single program cycle or another desired period of time. In an embodiment where additional messages that are in addition to the messages currently being transmitted reside in the queue, a predetermined delay time may be permitted to pass before those additional messages are sent across the network. The delay time may, for example, be a per message delay time that is multiplied by the predetermined number of messages or a number of messages that were sent during the last message transmission time period. For example, if 200 messages are transmitted across the network in one program cycle, and the predetermined delay time is 500 ms per message, then the delay time may be 200 messages * 500 ms per message=100 s before the additional messages are transmitted.

Figure 3:
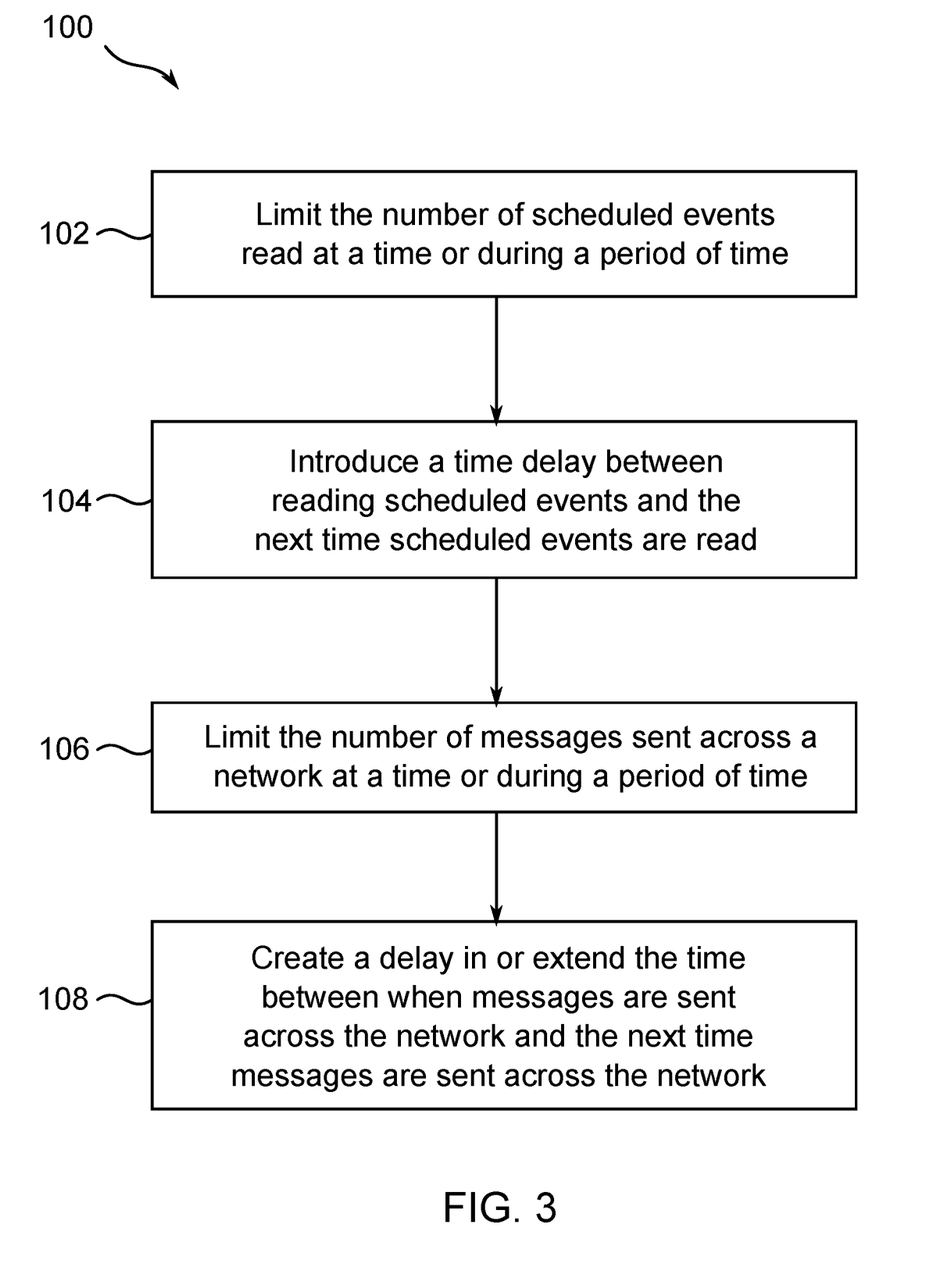
FIG. 3 illustrates an embodiment of a method of processor activity management.

FIG. 3 illustrates a method of processor activity management 100 that may be executed on the network traffic and processor activity management system illustrated in FIG. 1 and described in connection with FIG. 1. That method 100 may include operating strategies including limiting the number of scheduled events the processor 12 reads from the data storage device 36 at a time or during a predetermined period of time such as and iteration of the method or a program cycle, at 102. The method 100 may introduce a time delay between reading scheduled events and the next time scheduled events are read at 104.

The method 100 may limit the number of messages sent across a network 40, 42, or 70 at a time or during a predetermined period of time at 106 and create a delay in or extend the time between when messages are sent across the network 40, 42, or 70 and the next time messages are sent across the network 40, 42, or 70 at 108. The delay of 108 may, for example, be implemented by creating a delay in reading events that cause messages to be sent across the network 40, 42, or 70.

In performing its delay, a system for processor activity management may prevent more than the predetermined number of messages from being retrieved from the data processing device for a period of time which may be one or more iterations. An iteration may furthermore be a program cycle or other natural cycle of the system.

Figure 4:
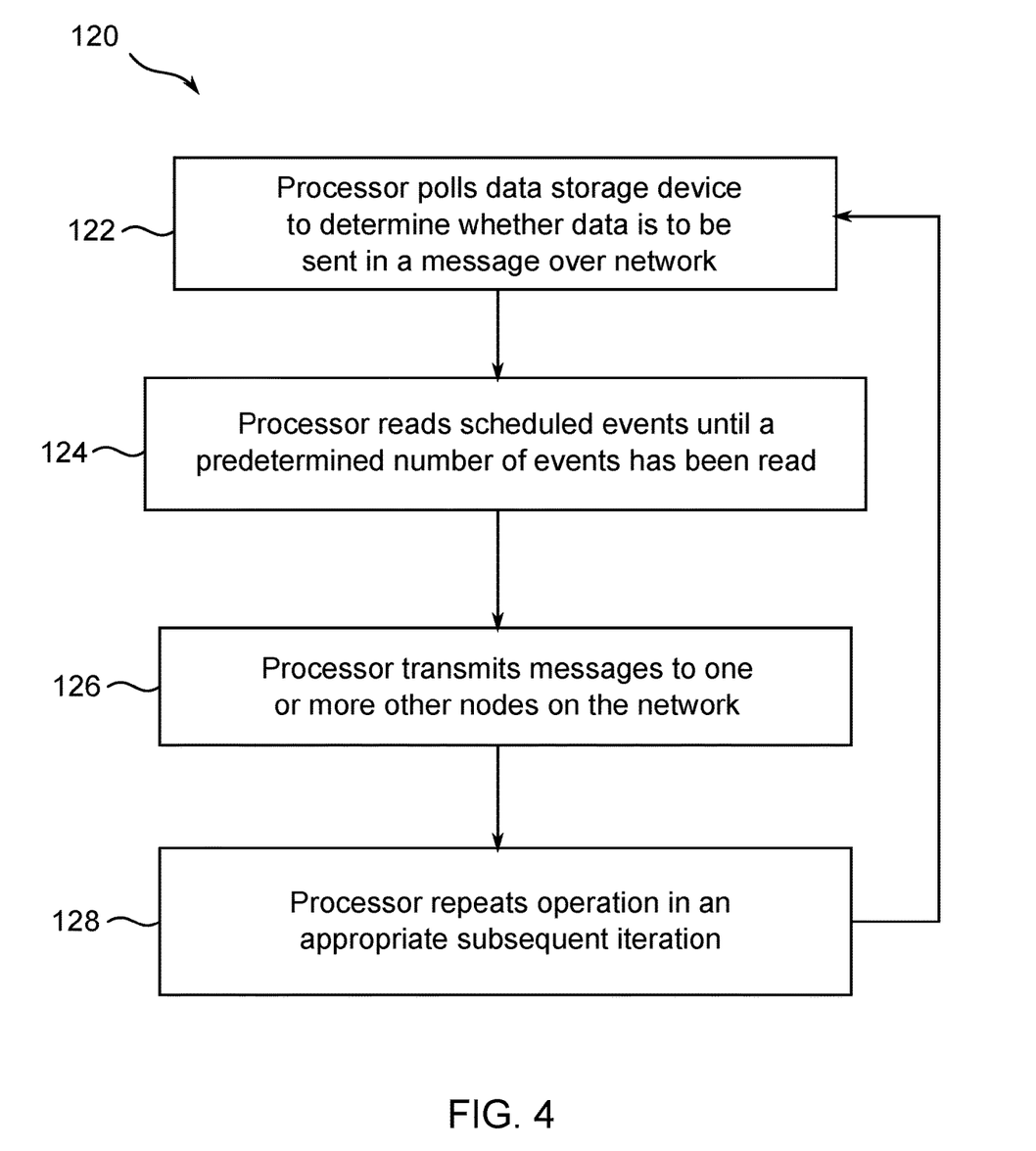
FIG. 4 illustrates an embodiment of a method of limiting the number of scheduled events a processor reads from a data storage device.

FIG. 4 illustrates a method of limiting the number of scheduled events the processor 12 reads from the data storage device 36 at a time or during a predetermined period of time 120. That method 120 may be used at 102 of the method of network traffic management 100. At 122, the processor 12 polls the data storage device 36 to determine whether data in the data storage device 36 is to be sent in a message over one or more of the networks 40, 42, or 70. At 124, the processor 12 reads scheduled events from the data storage device 36 until the processor 12 has read a number of scheduled events equal to a predetermined number of scheduled events permitted to be read by that processor 12. At 126, the processor 12 transmits scheduled events to one or more other nodes 11, 72, 74 or 75 over the network 40, 42, or 70. At 128, the processor 12 repeats the operation at 122-126 in an appropriate subsequent iteration.

In that subsequent iteration, the processor 12 may or may not have additional events to be read from the data storage device 36 or messages to be sent on the network 40, 42, or 70. When the processor 12 has previously reached its limit of scheduled events and, in certain embodiments, passed its message transmission delay period, the processor 12 may return to the data storage device 36 and retrieve additional scheduled events. In such a subsequent pass, the processor 12 may search for events that were to occur at a previously scheduled time between the time that the processor 12 last retrieved events and the current time. The processor 12 may then again retrieve up to the limit of scheduled events for processing and sending across the network 40, 42, or 70 at 122. The processor 12 may continue this process until all events scheduled up to the current time have been retrieved and sent across the network 40, 42, or 70.

Using that method 120, the network traffic and processor activity management system 100 may limit the number of scheduled events that the processor 12 reads from the data storage device 36 in a time period, such as a program cycle. The processor 12 may, for example, have a limit of 50 scheduled events per program cycle.

Figure 5:
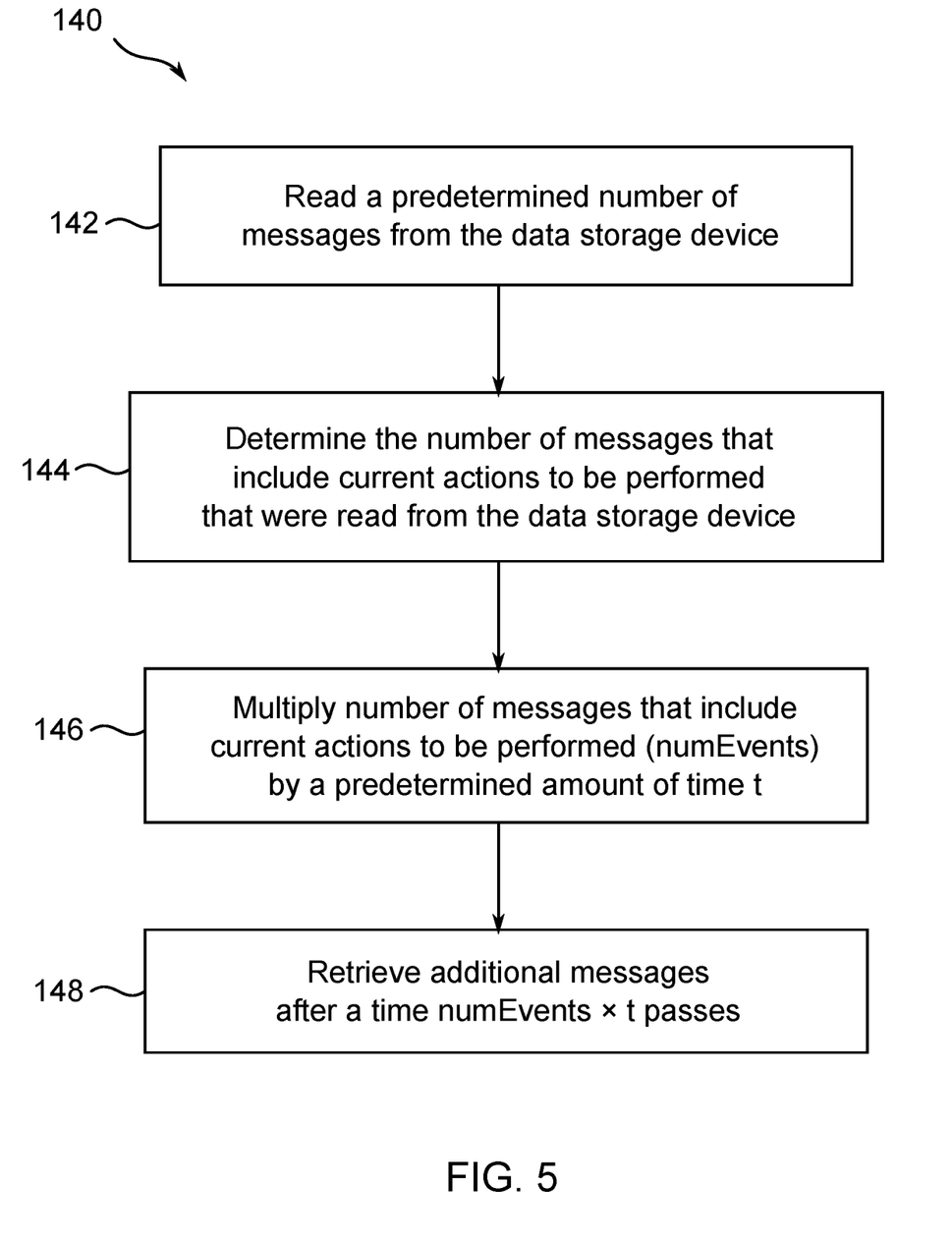
FIG. 5 illustrates an embodiment of a method of delaying processor access to scheduled events in a data storage device.

FIG. 5 illustrates a method 140 of delaying processor 12 access of scheduled events in the data storage device 36. The method 140 may be used at 104 of the method of network traffic management 100. Such a method 140 may be advantageous to prevent excessive processor 12 time from being occupied by accessing the data storage device 36. The method of delaying processor 12 access of scheduled events may alternately or in addition be advantageous to prevent transmission of an excessive number of messages across one or more networks 40, 42, or 70 since each scheduled event may need to be transmitted across one or more of those networks 30, 42, or 70. The method 140 may furthermore be used alone or in addition to the method of limiting the number of scheduled events the processor 12 reads 120 or any other method described herein.

The method of delaying processor access to scheduled events 140 may include reading a predetermined number of messages from the data storage device 36 at 142. At 144, the method 140 may determine the number of messages that include current actions to be performed that were read from the data storage device 36 at 142. It should be recognized that the number of messages that include current actions to be performed may be fewer than all messages read from the data storage device 36. That number of messages that include current actions to be performed that were read may be multiplied by a predetermined delay time at 146. The amount of time to be multiplied by the number of messages read that include current actions to be performed to determine the amount of time the processor 12 should wait before reading additional messages from the data processing device 36 may be, for example, 500 ms. At 148, the processor 12 may access the data processing device 36 to retrieve additional messages after the amount of time determined at 146 passes to provide time for the processor 12 to perform other functions or for previously sent messages to be transmitted across the network 40, 42, or 70.

Such a delay in accessing the data processing device 36 148 may be beneficial because reading messages from a data storage device 36 requires some processor 12 operating time and it may be desirable to free-up the processor 12 to perform other functions. Such a delay 146 may also or alternately be advantageous because it may be that most or all scheduled events read will have to be transmitted across one or more networks 40, 42, and 70 and each message transmitted across a network 40, 42, or 70 requires time and device resources to be executed and it may be desirable to free-up those devices so that those devices can perform other functions or transmit messages from other processors 12.

Once the processor 12 has read scheduled events from the data storage device 36 and, possibly, created additional messages, those messages may be transmitted across one or more networks 40, 42, or 70. Alternately, those messages may be placed in a queue, which may be processor 12 created, for transmission across the network 40, 42, or 70 as the processor 12 determines is appropriate.

Figure 6:
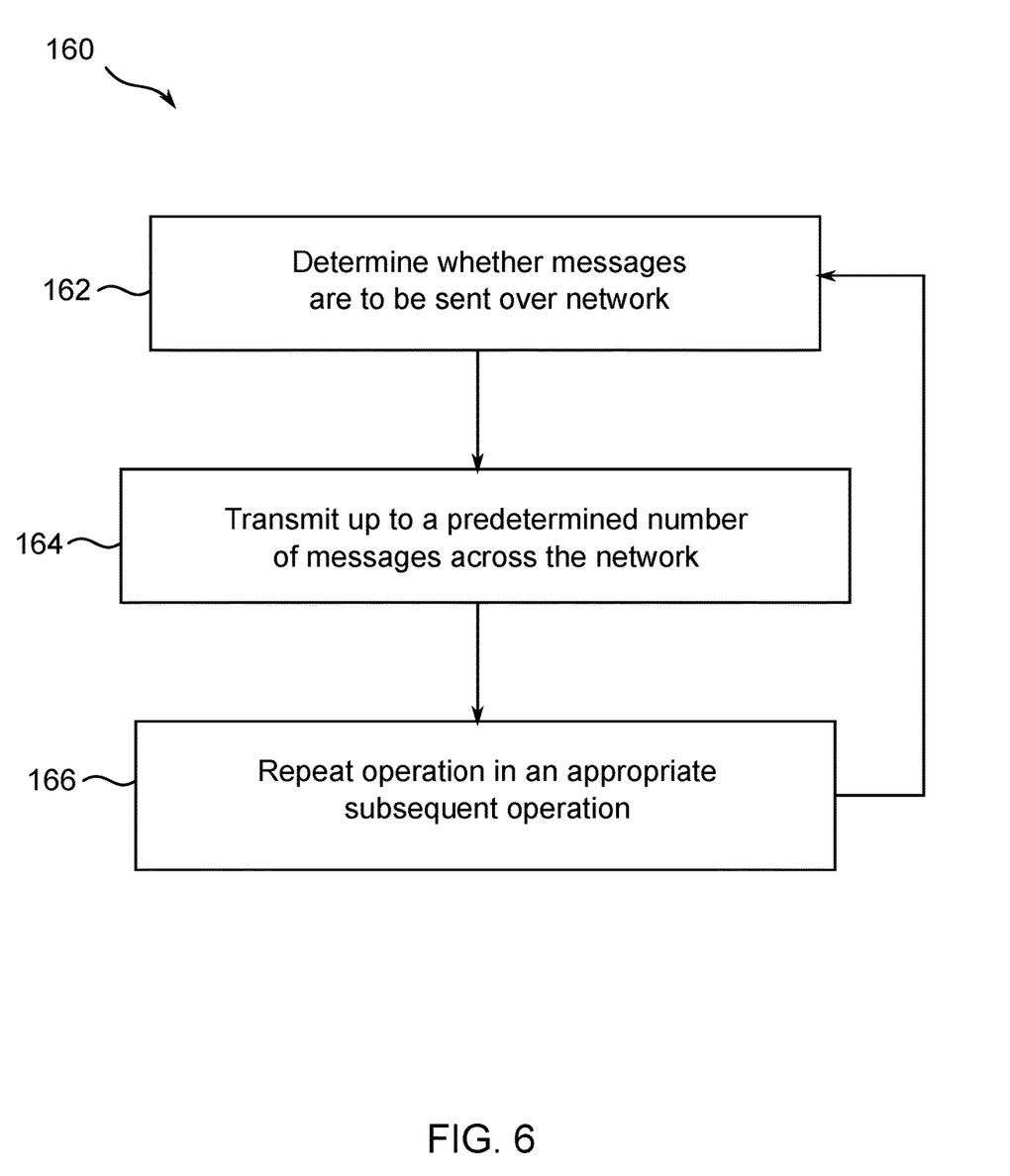
FIG. 6 illustrates an embodiment of a method of limiting a number of messages transmitted across a network.

FIG. 6 illustrates a method of limiting the number of messages transmitted across a network at a time or during a predetermined period of time 160. That method 160 may be used at 106 of the method of network traffic management 100. At 162, the processor 12 determines whether messages are to be transmitted across one or more networks 40, 42, or 70. Those messages may include only scheduled event messages or scheduled event messages and other messages. In determining whether there are messages to be transmitted, the processor 12 may examine one or more network message queues in which messages may be waiting to be sent over one or more networks 40, 42, or 70. At 164, the processor 12 will send up to a predetermined number of messages across the one or more networks 40, 42, or 70. Where, for example, there is more than one queue, such as a scheduled message queue and another message queue, the processor 12 may transmit up to a predetermined number of scheduled event messages and may transmit up to another predetermined number of other messages. Alternately, the processor 12 may transmit up to the predetermined number of scheduled messages and all other messages at 164. At 166, the processor 12 will return to 162 to repeat the method 160 in an appropriate subsequent iteration. In that way, the network traffic management system 100 may limit the number of messages that the processor 12 transmits in a time period, such as an iteration or a program cycle.

The processor 12 may, for example, have a limit of 50 message transmissions per cycle or iteration.

Messages to be sent may include scheduled events such as actuation of end devices. Actuation of end devices may include energization of lighting fixtures, lowering of blinds, energizing of mechanical and electrical equipment and alarms, and the opening and closing or modulation of valves and dampers.

Processor 12 determined messages may be an example of other messages sent at 164. Such processor 12 determined events may include, for example, blinds being raised or lowered based on sensed information like sunlight level, possibly combined with, schedule data. Any processor resident or created messages to be sent on the network may or may not be included with data storage device 36 messages.

In a subsequent iteration, such as a later program cycle, the processor 12 may or may not have additional messages to be sent on the network 40, 42, or 70. When the processor 12 has previously reached its predetermined message transmission limit and there are additional messages to be transmitted across one or more networks 40, 42, or 70, the processor 12 may transmit up to its predetermined message transmission limit of additional messages across the network 40, 42, or 70 in the subsequent iteration. Thus, in one or more subsequent iterations, the processor 12 may transmit additional messages, continuing this process until all scheduled event messages and other messages to be sent up to the current time have been transmitted across the network 40, 42, or 70.

Figure 7:
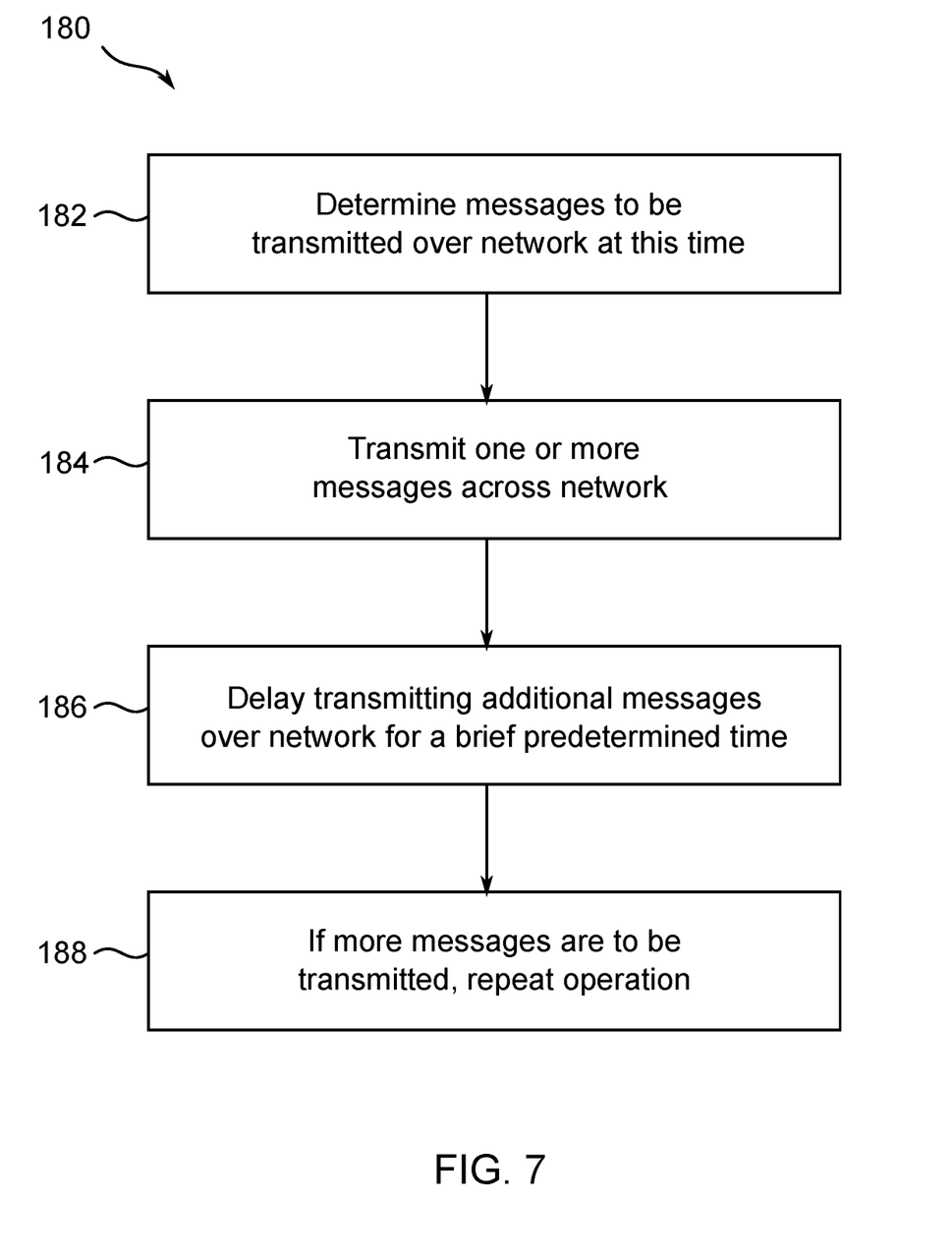
FIG. 7 illustrates an embodiment of a method for delaying processor transmission of messages across a network.

FIG. 7 illustrates a method 180 of delaying processor 12 transmission of messages across one or more of the networks 40, 42, or 70. Such a method may be advantageous to prevent the processor 12 or the network 40, 42, or 70 from being inundated or overly preoccupied with message transmissions. That method may include determining what messages are to be transmitted over the network at this time at 182. It may be recognized that each of those messages may be sent across the network 40, 42, or 70 serially, that each transmission requires some small amount of time, and that transmission of many messages at one time may cause transmission issues described herein. Thus, one or more messages is transmitted across the network 40, 42, or 70 at 184. A short predetermined delay time may then be provided at 186 such that transmission of one or more messages may be followed by a brief delay, such as, for example, a one second delay, to prevent transmission issues caused by too much transmission traffic at one time or over a short period of time. At 188, if more messages are queued to be transmitted, the method 180 may return to 184 to transmit one or more additional messages across the network 40, 42, or 70.

Figure 8:
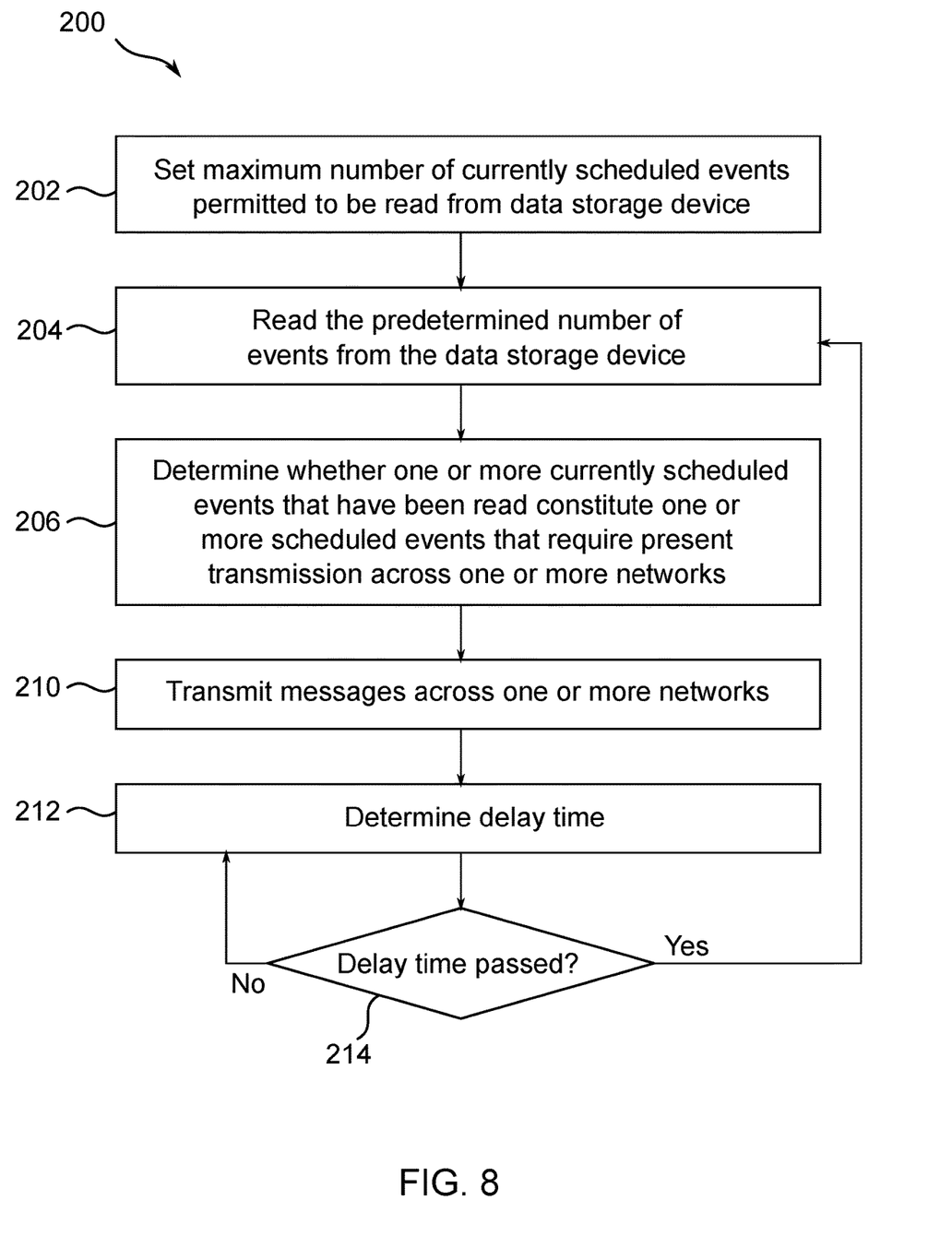
FIG. 8 illustrates another embodiment of managing network traffic.

FIG. 8 illustrates a method of managing network traffic 200. The method has a predetermined maximum number of events that the processor 12 is permitted to read from the data storage device 36 at 202.

In one embodiment, that maximum number of events of 202 is a fixed number of events, such as 20 events. Thus, it should be recognized that certain of the read events may require current action, such as transmission of a message over one or more networks 40, 42, or 70, while other of the read events may not require current action but may, for example, contain actions to be taken at another time.

At 204, the processor 12 accesses the data storage device 36 and reads the predetermined number of events from the data storage device 36. The processor 12 may furthermore prevent more than the predetermined number of events from being read at 204 in an iteration, such as a program cycle. At 206, the processor 12 accesses the time from the real-time clock 38 and determines whether one or more of the events read from the data storage device 36 constitute one or more scheduled events that require present transmission across one of the networks 40, 42, or 70 to one or more nodes 11, 72, 74, 76, or 77 in the network 40, 42, or 70. At 210, the processor 12 transmits the messages containing events read from the data storage device 36 and any processor 12 created messages across one or more networks 40, 42, or 70. At 212, the processor 12 determines a time delay before the processor will read additional messages from the data storage device 36. The time delay may be based on the number of events read by the processor 12 that require current actions to be performed. At 214, after the delay time has passed since the last read of currently scheduled events, the processor 12 returns to 204 and reads additional events from the data storage device 36. Those additional read events could be current or could be left over from a previous cycle. If the delay time from 212 has not passed, the processor 12 performs its programmed instructions without reading additional currently scheduled events from the data storage device 36 or transmitting additional currently scheduled messages across the network 40, 42, or 70.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A network traffic management system for limiting a number of scheduled hardware actuating event messages to be transmitted over a network at a given time, comprising:
    a network communication device for communicating data to remote devices communicating on a network;
    a data storage device for storing a plurality of events that each cause another node on the network to actuate hardware, the plurality of events to be communicated on the network by the network communication device;
    a real-time clock; and
    a processor coupled to the network communication device, the data storage device, and the real-time clock, the processor including instructions which, when executed by the processor, cause the processor to:
        receive a time signal indicating the current time from the real-time clock;
        determine a maximum number of scheduled hardware actuating events to be transmitted over the network at this time;
        retrieve up to the maximum number of scheduled hardware actuating events from the data storage device, each scheduled hardware actuating event including an action to be performed at a scheduled time and the scheduled time for each retrieved scheduled event to occur having arrived; and
        transmit at least one message associated with each retrieved scheduled hardware actuating event over the network through the network communication device.

2. The network traffic management system of claim 1, wherein the maximum number of scheduled hardware actuating events is a predetermined number of scheduled hardware actuating events and wherein the processor further includes instructions which, when executed by the processor, cause the processor to prevent more than the predetermined number of scheduled hardware actuating events from being retrieved from the data storage device in an iteration.

3. The network traffic management system of claim 2, wherein the processor prevents more than the predetermined number of scheduled events from being retrieved from the data processing device for a predetermined period of time.

4. The network traffic management system of claim 3, wherein the predetermined period of time is based on the number of scheduled events requiring current transmission over the network retrieved in an iteration.

5. The network traffic management system of claim 1, wherein the processor further includes instructions which, when executed by the processor, cause the processor to:
    retrieve up to another maximum number of scheduled hardware actuating events from the data storage device that are to be transmitted over the network through the network communication device in a second iteration, each scheduled event including an action to be performed at a scheduled time and the scheduled time for each retrieved scheduled event to occur having arrived; and transmit the retrieved scheduled events over the network through the network communication device in the second iteration.

6. The network traffic management system of claim 2, wherein the processor further includes instructions which, when executed by the processor, cause the processor to prevent more than a second predetermined number of scheduled events from being transmitted on the network during a second iteration.

7. The network traffic management system of claim 6, wherein the processor further includes instructions which, when executed by the processor, cause the processor to prevent more than the second predetermined number of scheduled events from being transmitted on the network for a predetermined period of time.

8. The network traffic management system of claim 7, wherein the second predetermined period of time is based on the number of scheduled events transmitted in the second iteration.

9. A network traffic management method for limiting a number of scheduled event messages to be transmitted over a network at a given time, comprising:
   receiving a time signal indicating the current time from a real-time clock;
   determining a maximum number of scheduled hardware actuating events to be transmitted over the network at this time;
   retrieving up to the maximum number of scheduled hardware actuating events from a data storage device, each scheduled hardware actuating event to cause an action to occur at a time associated with the scheduled event and the scheduled time for each retrieved scheduled event to occur having arrived; and
   transmitting at least one message associated with each retrieved scheduled hardware actuating event over the network through the network communication device.

10. The network traffic management method of claim 9, wherein the maximum number of scheduled hardware actuating events is a predetermined number of scheduled hardware actuating events and further comprising preventing more than the predetermined number of scheduled events from being retrieved from the data processing device in an iteration.

11. The network traffic management method of claim 10, wherein the predetermined number of scheduled events is prevented from being retrieved from the data processing device for a predetermined period of time.

12. The network traffic management system of claim 11, wherein the predetermined period of time is based on the number of scheduled events requiring current transmission over the network retrieved in an iteration.

13. The network traffic management system of claim 12, wherein an iteration is a program cycle.

14. The network traffic management system of claim 13, further comprising transmitting up to a second predetermined number of scheduled hardware actuating events on the network in a second iteration.

15. The network traffic management system of claim 14, further comprising preventing more than the second predetermined number of scheduled hardware actuating events from being transmitted on the network for a second predetermined period of time.

* * * * *